US011230268B2

(12) United States Patent
Kim

(10) Patent No.: US 11,230,268 B2
(45) Date of Patent: Jan. 25, 2022

(54) WIPER BLADE ASSEMBLING ADAPTER, WIPER BLADE ASSEMBLY, AND WIPER APPARATUS

(71) Applicant: CAP CORPORATION, Gyeongsangbuk-Do (KR)

(72) Inventor: Myoung Yeon Kim, Ulsan (KR)

(73) Assignee: CAP CORPORATION, Gyeongsangbuk-Do (KR)

( * ) Notice: Subject to any disclaimer, the term of this patent is extended or adjusted under 35 U.S.C. 154(b) by 0 days.

(21) Appl. No.: 16/855,667

(22) Filed: Apr. 22, 2020

(65) Prior Publication Data
US 2021/0107434 A1    Apr. 15, 2021

(30) Foreign Application Priority Data
Oct. 14, 2019    (KR) .................... 10-2019-0127207

(51) Int. Cl.
*B60S 1/40*    (2006.01)
*B60S 1/38*    (2006.01)

(52) U.S. Cl.
CPC ........... *B60S 1/4045* (2013.01); *B60S 1/4048* (2013.01); *B60S 1/3849* (2013.01); *B60S 2001/4051* (2013.01); *B60S 2001/4058* (2013.01)

(58) Field of Classification Search
CPC ........ B60S 1/4038; B60S 1/40; B60S 1/4045; B60S 1/4048; B60S 1/3879; B60S 1/381; B60S 2001/4058; B60S 2001/4051; B60S 2001/4054; B60S 1/3849
USPC ...................................... 15/250.32
See application file for complete search history.

(56) References Cited

U.S. PATENT DOCUMENTS

| 9,073,519 | B2 * | 7/2015 | Depondt ............... B60S 1/4083 |
| 9,073,520 | B2 | 7/2015 | Ozer et al. |
| 2010/0205763 | A1 * | 8/2010 | Ku ........................ B60S 1/4003 |
| | | | 15/250.32 |
| 2012/0233802 | A1 * | 9/2012 | Depondt ................. B60S 1/407 |
| | | | 15/250.33 |
| 2013/0152330 | A1 | 6/2013 | Kim et al. |
| 2013/0333146 | A1 | 12/2013 | Depondt |

(Continued)

FOREIGN PATENT DOCUMENTS

| EP | 3345796 A1 | 7/2018 |
| EP | 3339114 B1 | 9/2019 |

(Continued)

OTHER PUBLICATIONS

Machine translation of Korean application 1020110027545, published Dec. 12, 2012. (Year: 2012).*

(Continued)

*Primary Examiner* — Gary K. Graham
(74) *Attorney, Agent, or Firm* — IP & T Group LLP

(57) ABSTRACT

The present invention relates to a wiper blade assembling adapter, a wiper blade assembly, and a wiper apparatus. There is provided a wiper blade assembling adapter for coupling a wiper blade to a wiper arm, which has an arm part configured to rotate about a proximal end and a cover part coupled to a distal end of the arm part, wherein a coupling element protrudes inward from a lower side of a rear end at a side surface of the cover part, the wiper blade assembling adapter including a main body part coupled to the wiper blade and a locking part rotatably provided in the main body part.

11 Claims, 11 Drawing Sheets

(56) References Cited

U.S. PATENT DOCUMENTS

| | | |
|---|---|---|
| 2016/0375865 A1 | 12/2016 | Aliberti et al. |
| 2016/0375874 A1 | 12/2016 | Aliberti et al. |
| 2018/0186340 A1* | 7/2018 | Huang .................. B60S 1/4003 |
| 2019/0031151 A1 | 1/2019 | Moneyron et al. |
| 2019/0031152 A1 | 1/2019 | Moneyron et al. |
| 2019/0118777 A1 | 4/2019 | Poton et al. |
| 2019/0118779 A1 | 4/2019 | Poton et al. |
| 2021/0107433 A1 | 4/2021 | Kim |

FOREIGN PATENT DOCUMENTS

| | | |
|---|---|---|
| KR | 10-2011-0000855 A | 1/2011 |
| KR | 10-2012-0092570 A | 8/2012 |
| KR | 10-1198352 B1 | 11/2012 |
| KR | 10-1211096 * | 12/2012 |

OTHER PUBLICATIONS

Office Action issued by the Korea Intellectual Property Office dated Dec. 14, 2020.

Extended European Search Report issued by on European Patent Office dated Jan. 25, 2021.

* cited by examiner

WIPER BLADE ASSEMBLING ADAPTER, WIPER BLADE ASSEMBLY, AND WIPER APPARATUS

CROSS-REFERENCE TO RELATED APPLICATION

This application claims priority to and the benefit of Korean Patent Application No. 10-2019-0127207, filed on Oct. 14, 2019, the disclosure of which is incorporated herein by reference in its entirety.

BACKGROUND

1. Field of the Invention

The present invention relates to a wiper blade assembling adapter, a wiper blade assembly, and a wiper apparatus, and more particularly, to a wiper blade assembling adapter, a wiper blade assembly, and a wiper apparatus capable of facilitating separation from a wiper arm and guaranteeing a firm fastening force to the wiper arm.

2. Discussion of Related Art

Generally, a wiper apparatus is installed on a vehicle or the like to wipe off a surface of a windshield. The wiper apparatus includes a wiper motor, a wiper arm, a wiper blade, and the like, and an adapter may be used for structural connection between the wiper arm and the wiper blade.

The wiper arm is connected to a rotating shaft of the wiper motor at a proximal end and rotates by the wiper motor. One or more wiper arms may be provided according to the size of the windshield. In a case in which a plurality of wiper arms are provided, the wiper arms are disposed such that rotations thereof do not interfere with each other.

Also, the wiper blade is separably coupled to an end of the wiper arm through an adapter. While being disposed in the form of a straight line and maintaining a state of being in close contact with the windshield, the wiper blade slides and wipes off a surface of the windshield by movement of the wiper arm that rotates.

In a state in which the wiper blade is installed on the vehicle, the wiper blade continuously rubs against the windshield. Thus, as the period of use elapses, the wiper blade may wear out or generate unnecessary noise, or the performance of the wiper blade wiping off the surface may deteriorate.

Therefore, regular replacement is required for the wiper blade. Here, a user of the vehicle separates the existing wiper blade from the wiper arm and then fastens a new wiper blade using the adapter.

However, because the wiper arm has various shapes according to the type, an adapter having a form suitable for the wiper arm is required. Also, the adapter should facilitate replacement of the wiper blade and allow the wiper blade, which is fastened to the wiper arm, to stably maintain the state of being in close contact with the windshield despite wind resistance or the like.

Therefore, in consideration of the shape of the wiper arm, many developments have been made on the structure of the adapter that effectively connects the wiper blade to the wiper arm.

SUMMARY OF THE INVENTION

The present invention is directed to providing a wiper blade assembling adapter, a wiper blade assembly, and a wiper apparatus capable of stably maintaining seating of a wiper using a locking part that rotates, thereby guaranteeing a degree of close contact with a windshield and making it very convenient to replace the wiper.

According to an aspect of the present invention, there is provided a wiper blade assembling adapter for coupling a wiper blade to a wiper arm, which has an arm part configured to rotate about a proximal end and a cover part coupled to a distal end of the arm part, wherein a coupling element protrudes inward from a lower side of a rear end at a side surface of the cover part, the wiper blade assembling adapter including a main body part coupled to the wiper blade and a locking part rotatably provided in the main body part, wherein the main body part includes a guide part, which has an insertion part into which the coupling element of the wiper arm is inserted in a first direction and a catching part which extends from the insertion part and is configured to block movement of the coupling element in the first direction after the coupling element moves in a second direction, and a hinge part disposed at one side of the guide part, and the locking part has a rotary surface which is rotatably coupled to the hinge part and a cover surface which extends from the rotary surface and covers an outer surface of the wiper arm that surrounds the main body part.

Specifically, a step part, on which a lower end of the cover part is seated, may protrude from a side surface of the main body part.

Specifically, an opening that comes in communication with the insertion part may be provided at a position on the step part that corresponds to the catching part.

Specifically, the main body part may further include a sidewall part that protrudes from a surrounding portion of the step part and surrounds a side surface of the cover part.

Specifically, the sidewall part may have a first sidewall part, which protrudes from the surrounding portion of the step part adjacent to the hinge part and comes in contact with the locking part, and a second sidewall part, which protrudes from the surrounding portion of the step part outer side of the insertion part and covers the coupling element.

Specifically, a chamfer having a shape corresponding to the sidewall part may be provided at a portion of the rotary surface that faces the sidewall part.

Specifically, a rotation limiting element may protrude from one side of the hinge part, and the locking part may change between an unlocking state, in which a lower end of the cover surface is disposed below the rotation limiting element and causes an outer surface of the main body part to be exposed, and a locking state, in which the rotary surface rotates and the lower end of the cover surface moves over the rotation limiting element and covers the outer surface of the main body part.

Specifically, the cover surface may have a cover element that extends from a distal end toward the guide part, and the cover element may cover the cover part seated on the main body part n the locking state.

Specifically, the hinge part may be provided as a pair of hinge parts at both sides of one surface of the main body part, each hinge part may be provided in the form of a free end that is deformable so that distal ends of the hinge parts are able to come close to each other, and an elastic bar configured to connect the pair of hinge parts to each other may be provided to maintain a gap between the hinge parts.

According to an aspect of the present invention, there is provided a wiper blade assembly including a wiper blade which has a close contact member configured to come in close contact with a surface of a target of close contact, and an adapter which is fastened to the wiper blade and to and from which a wiper arm, which has a form in which a cover part is coupled to a distal end of an arm part, is attached and detached, wherein the adapter includes a main body part coupled to the wiper blade and a locking part rotatably provided in the main body part, the main body part includes an insertion part into which a coupling element, which protrudes from a side surface of the cover part that surrounds a side surface of the main body part, is inserted and a catching part configured to catch the coupling element seated thereon after passing through the insertion part, and the locking part has a rotary surface which is rotatably connected to the main body part and a cover surface which covers an outer surface of the wiper arm that covers an outer surface of the main body part.

Specifically, the wiper blade may further include an elastic member configured to provide an elastic force to the close contact member in a direction in which close contact with the close contact member occurs, and a cover member configured to cover the elastic member.

Specifically, the wiper blade may further include a coupling cover provided at a center and to which the adapter is coupled, a coupling hole in a cylindrical shape whose one side is open may be provided in any one of the main body part and the coupling cover, and a bar-shaped seating element configured to be forcibly fitted to the coupling hole may be provided at the other one of the main body part and the coupling cover.

Specifically, the seating element may be fastened to the coupling hole and serve as a hinge shaft so that the wiper arm and the wiper blade rotate relative to each other.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
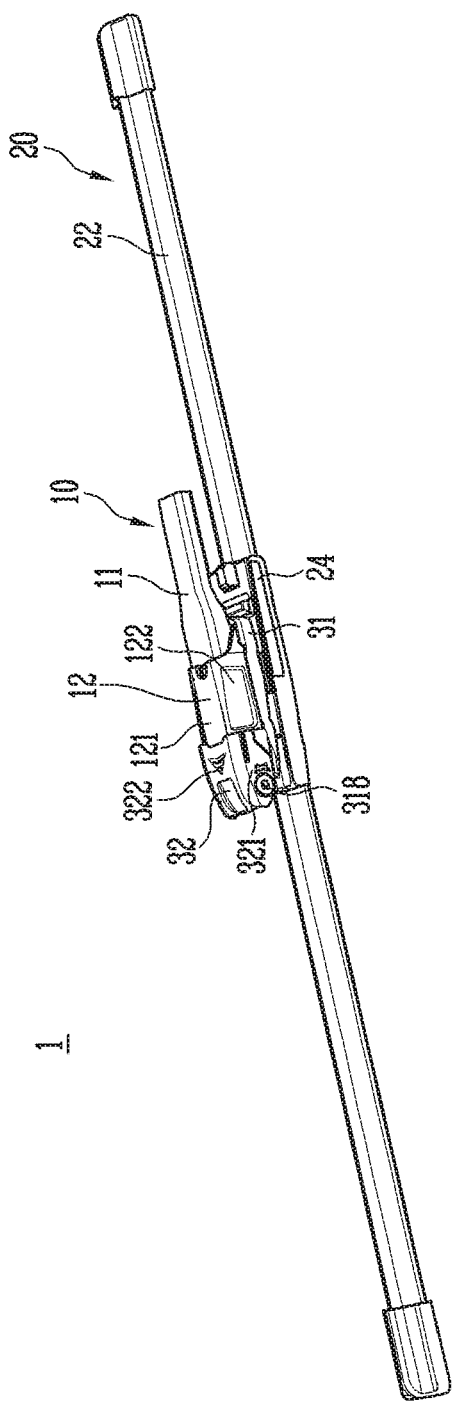
FIG. 1 is a perspective view of a wiper apparatus according to an embodiment of the present invention.

The objectives, specific advantages, and novel features of the present invention will become more apparent from the detailed description and the preferred embodiments below to be referenced to the accompanying drawings. In giving reference numerals to elements in each drawing of this specification, it should be noted that like reference numerals are given to like elements as much as possible even when the elements are illustrated in different drawings. In addition, in describing the present invention, when detailed description on a known related art deemed to unnecessarily obscure the gist of the present invention, the detailed description thereof will be omitted.

Also, for reference, note that small differences that may exist between the drawings included herein may be interpreted as constituting different embodiments included in the present invention.

Figure 2:
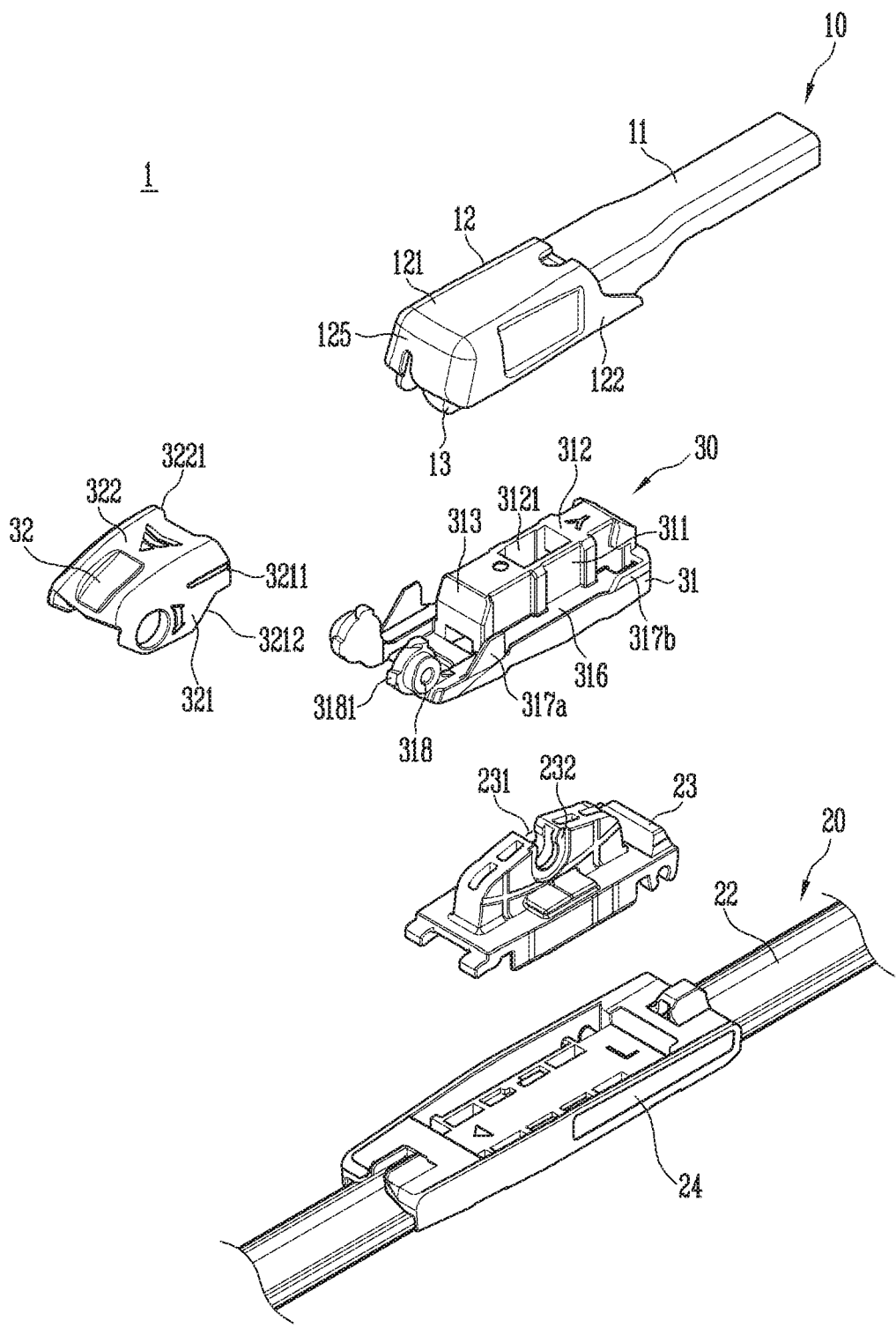
FIGS. 2 and 3 are exploded perspective views of the wiper apparatus according to an embodiment of the present invention.
Figure 3:
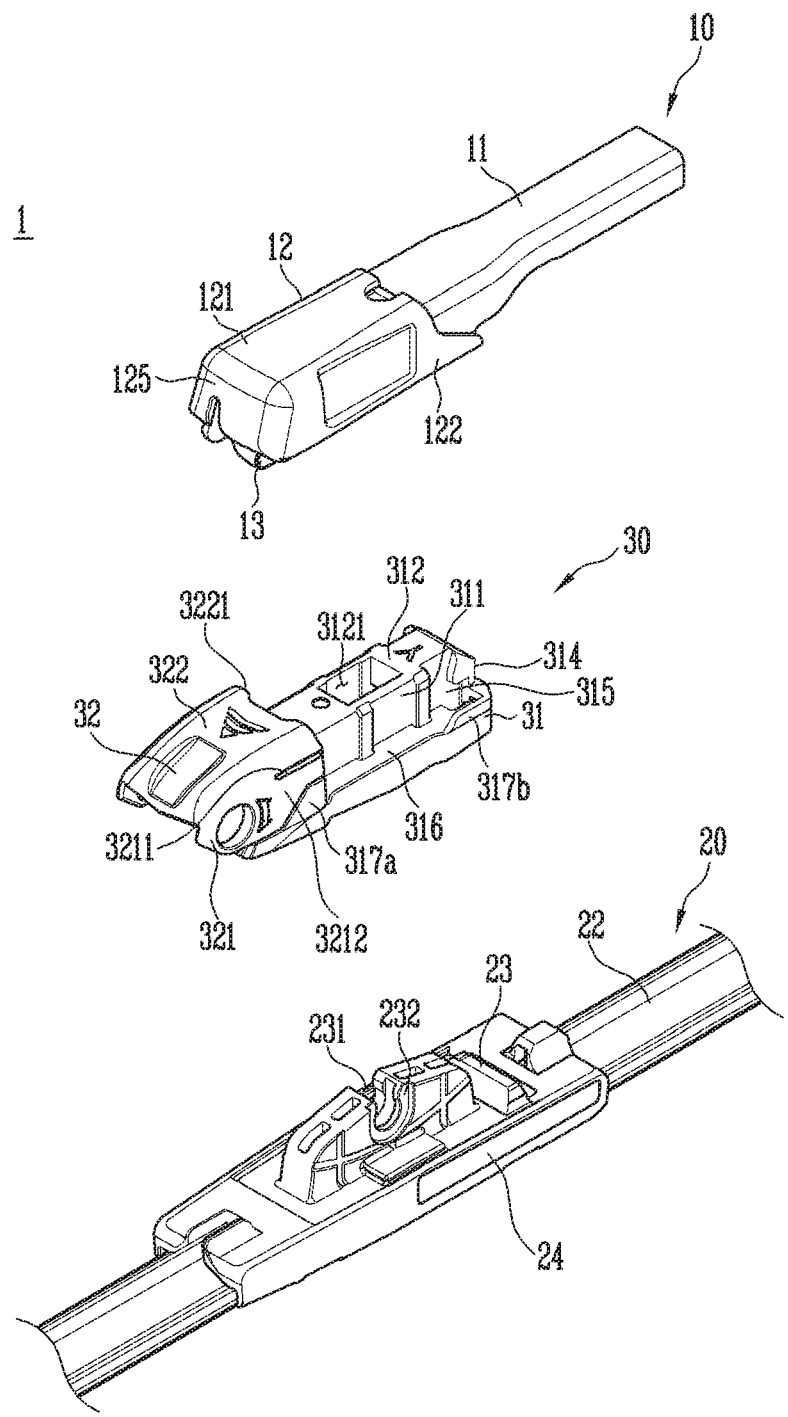

FIG. 1 is a perspective view of a wiper apparatus according to an embodiment of the present invention, and FIGS. 2 and 3 are exploded perspective views of the wiper apparatus according to an embodiment of the present invention.

Figure 4:
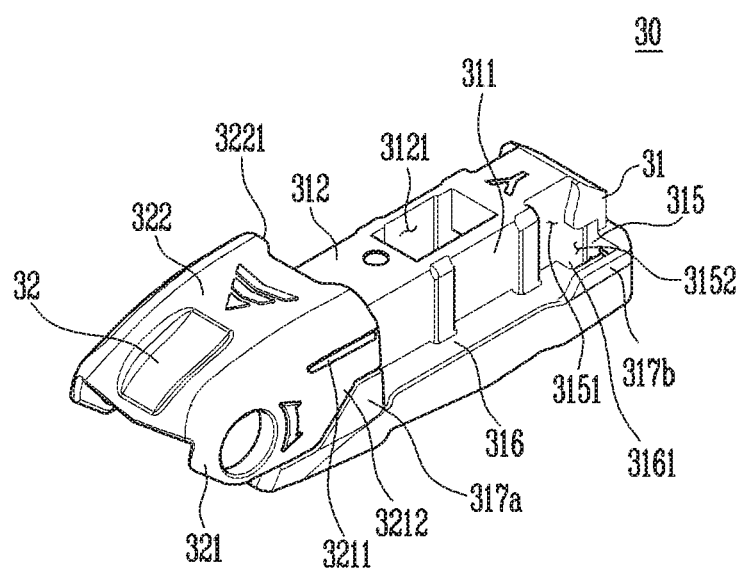
FIG. 4 is a perspective view of a wiper blade assembling adapter according to an embodiment of the present invention.
Figure 5:
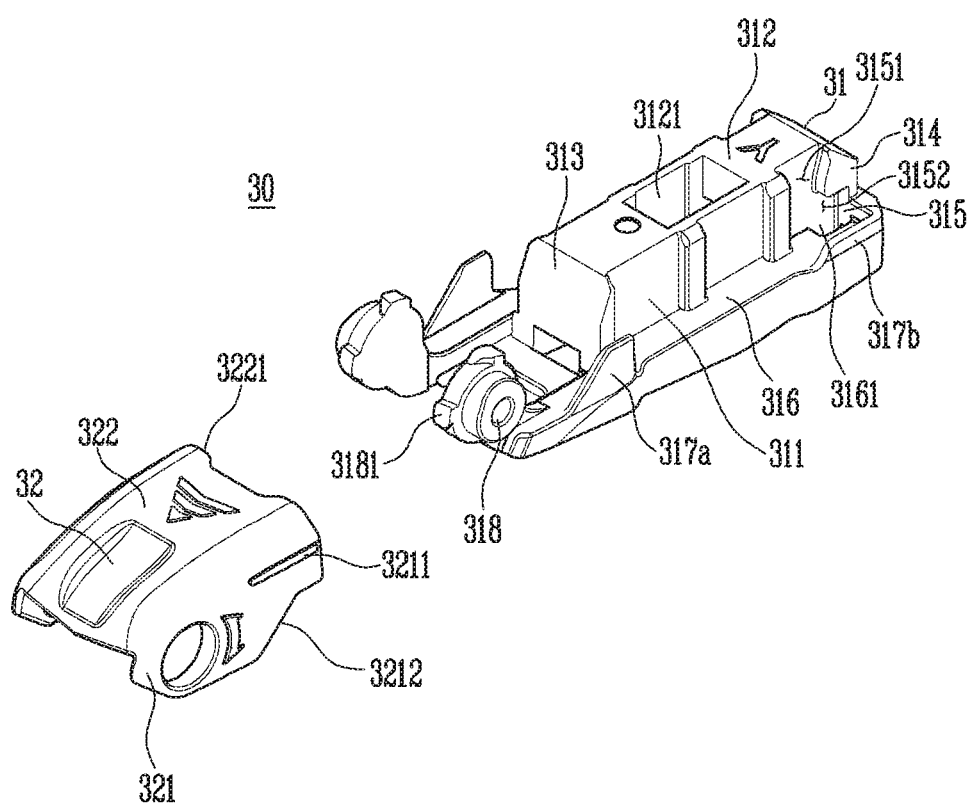
FIG. 5 is an exploded perspective view of the wiper blade assembling adapter according to an embodiment of the present invention.

FIG. 4 is a perspective view of a wiper blade assembling adapter according to an embodiment of the present invention, and FIG. 5 is an exploded perspective view of the wiper blade assembling adapter according to an embodiment of the present invention.

Figure 6:
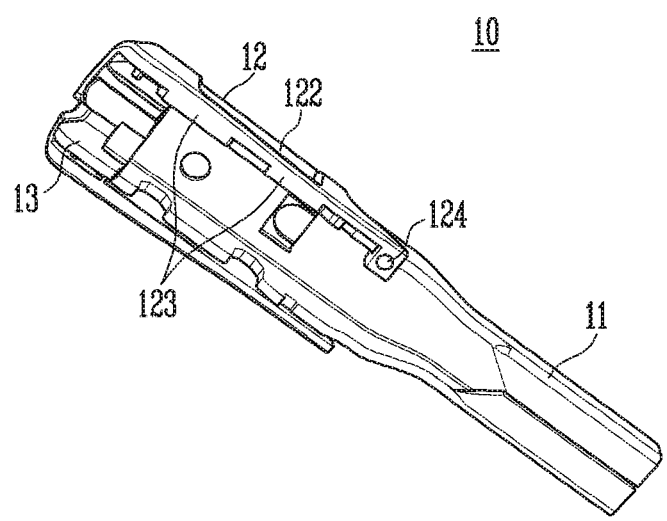
FIG. 6 is a perspective view of a wiper arm according to an embodiment of the present invention.
Figure 7:
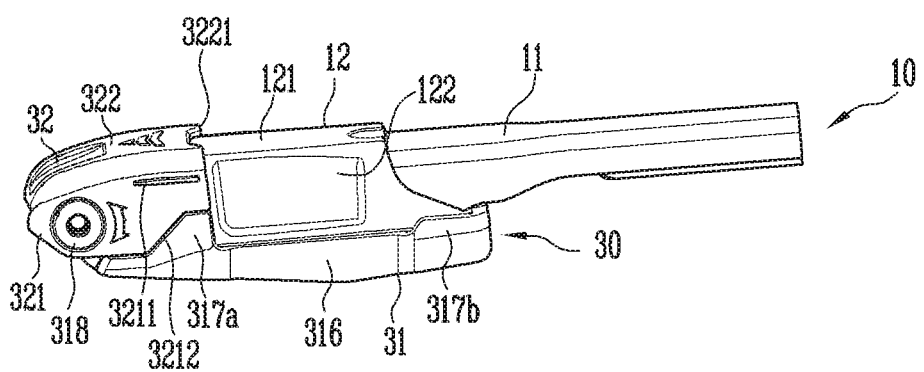
FIGS. 7 and 8 are perspective views of a wiper blade assembly according to an embodiment of the present invention.
Figure 8:
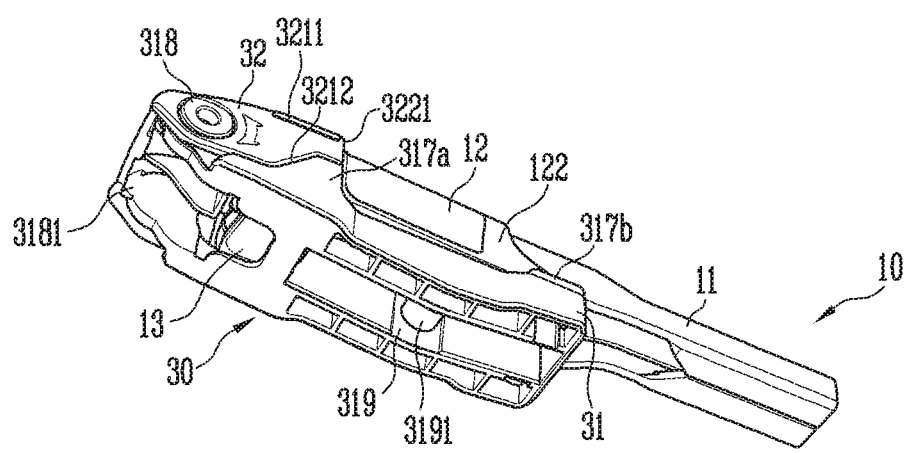
Figure 9:
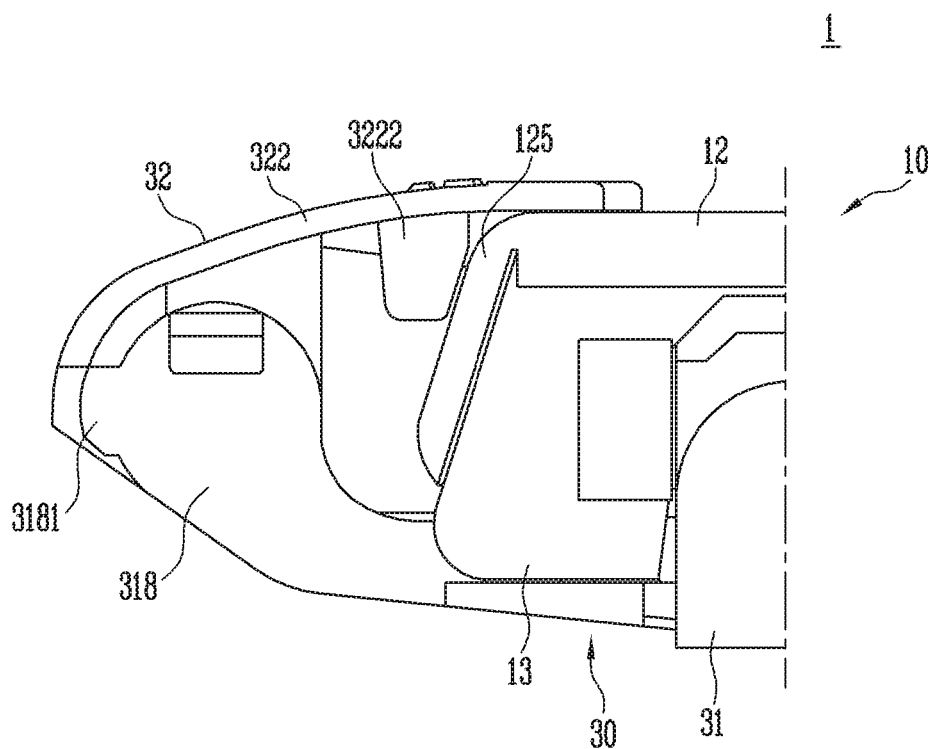
FIG. 9 is a cross-sectional view of a portion of the wiper blade assembly according to an embodiment of the present invention.

Also, FIG. 6 is a perspective view of a wiper arm according to an embodiment of the present invention, FIGS. 7 and 8 are perspective views of a wiper blade assembly according to an embodiment of the present invention, and FIG. 9 is a cross-sectional view of a portion of the wiper blade assembly according to an embodiment of the present invention.

Figure 10:
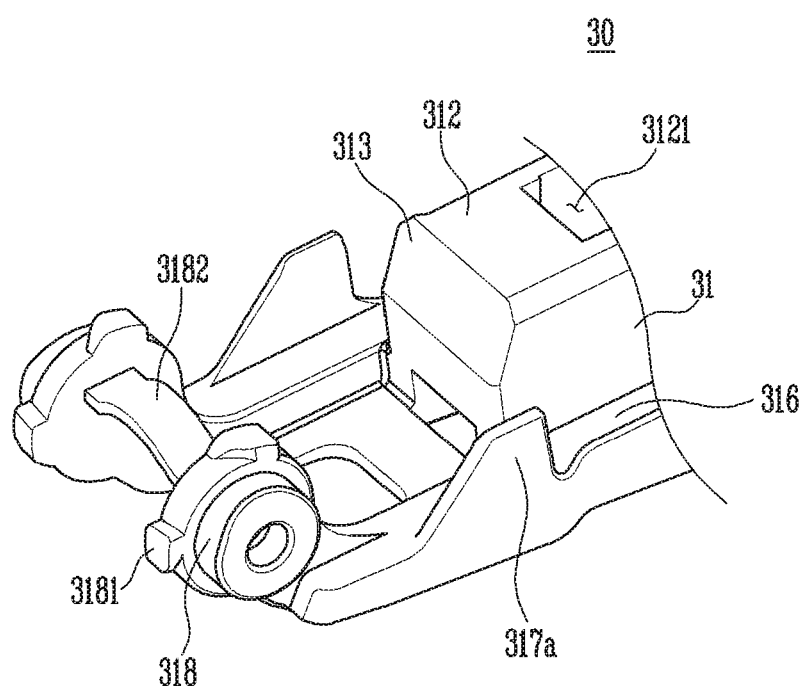
FIG. 10 is a perspective view of a portion of the wiper blade assembling adapter according to an embodiment of the present invention.
Figure 11A:
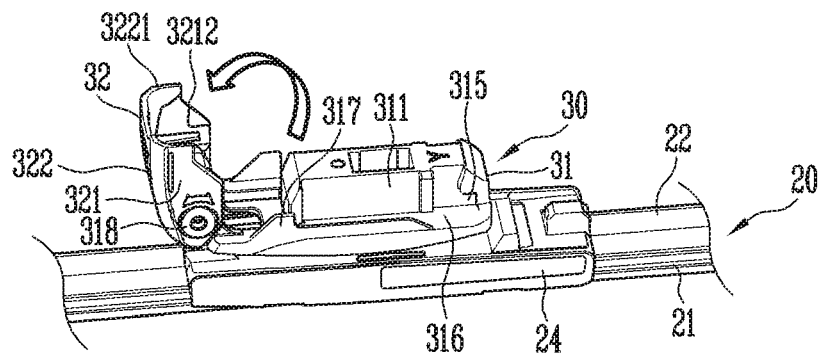
FIGS. 11A, 11B, and 11C are views for describing assembling of the wiper apparatus according to an embodiment of the present invention.
Figure 11B:
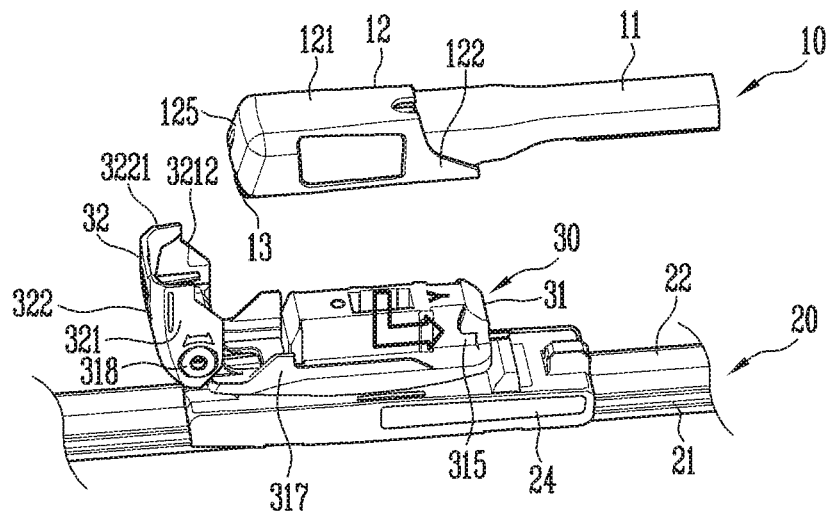
Figure 11C:
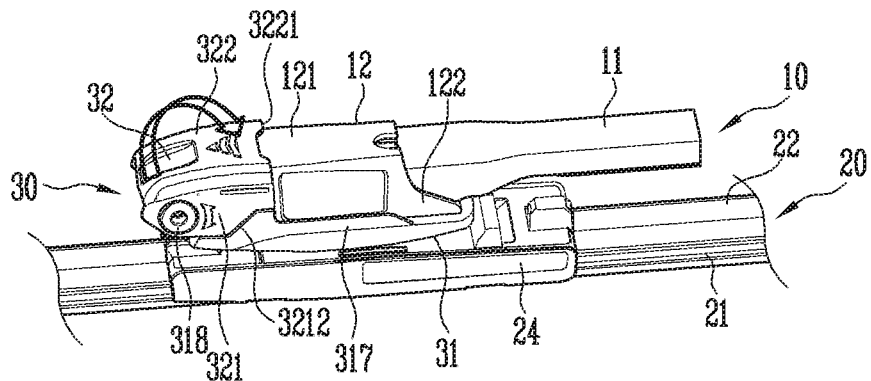

Also, FIG. 10 is a perspective view of a portion of the wiper blade assembling adapter according to an embodiment of the present invention, and FIGS. 11A to 11C are views for describing assembling of the wiper apparatus according to an embodiment of the present invention.

Referring to FIGS. 1 to 11C, a wiper apparatus 1 according to an embodiment of the present invention includes a wiper arm 10, a wiper blade 20, and an adapter 30 for assembling the wiper blade 20 (hereinafter referred to as "adapter 30").

For reference, in this specification, an assembly of the wiper blade 20 may refer to a state in which the wiper blade 20 and the adapter 30 are coupled.

Also, hereinafter, an inner surface and an outer surface refer to a direction heading toward a target of close contact and a direction moving away from the target of close contact, respectively, a side surface refers to a surface between the inner surface and the outer surface, and a front surface and a rear surface are surfaces differentiated with a direction moving away from a proximal end of the wiper arm 10 set as the front. However, such expressions are merely terms for aiding in description of the present invention based on the drawings, and thus the right of the present invention is not limited by the terms.

The wiper arm 10 rotates about the proximal end, has a distal end connected to the wiper blade 20, and transmits a rotational force to the wiper blade 20, thereby implementing cleaning of a target of close contact by the wiper blade 20.

The wiper arm 10 has an arm part 11 and a cover part 12. A driving source (a motor or the like) for rotating the wiper arm 10 is directly or indirectly connected to a proximal end of the arm part 11, and a distal end of the arm part 11 rotates in an arc by a rotational force of the driving source.

The arm part 11 may be formed in the shape of a bar that extends between the proximal end and the distal end. The arm part 11 may be formed of a metal material for durability, but the material of the arm part 11 is not limited thereto.

Also, the arm part 11 may have various other shapes as long as the arm part 11 is able to connect the proximal end and the distal end.

The cover part 12 is coupled to the distal end of the arm part 11. For stable coupling with the cover part 12, the arm part 11 may have a shape in which a horizontal width gradually increases toward the distal end.

Alternatively, a distal end portion of the arm part 11 that is coupled to the cover part 12 may be separately referred to as "fastening part (not denoted by a reference numeral)." The fastening part may be integrally formed with the remaining portions of the arm part 11 or may be coupled to the remaining portions of the arm part 11 and form the distal end of the arm part 11. Hereinafter, for convenience, description will be given assuming that the distal end of the arm part 11 is differentiated as the fastening part.

The fastening part may be formed of a C-shaped or U-shaped cross-section that has an outer surface (not denoted by a reference numeral) and a pair of side surfaces (not denoted by a reference numeral), wherein the cross-section is hollow. Also, to allow the fastening part to be coupled to the remaining portions of the arm part 11, as lower sides of the side surfaces of the fastening part are bent or curved, the fastening part may be deformed to surround the remaining portions of the arm part 11 and be inseparably fixed.

All of the outer surface and the side surfaces of the fastening part may be surrounded by the cover part 12 which will be described below. That is, in other words, the cover part 12 is coupled to the arm part 11 via the fastening part while surrounding the fastening part.

Here, as a fixing protrusion 123 of the cover part 12 is caught at the lower side of the side surface of the fastening part, the cover part 12 may be fixed without being separated outward from the distal end of the arm part 11.

The cover part 12 is provided at the distal end of the arm part 11. As shown in the drawings, the cover part 12 may be fixedly installed at the arm part 11. The cover part 12 may include an outer surface 121, which is in an outward direction from a target of close contact, and a pair of side surfaces 122, which extend toward the target of close contact from both sides of the outer surface 121. That is, like the fastening part, the cover part 12 has a C-shaped or U-shaped cross-section that is hollow, and the cover part 12 overlaps the fastening part when coupled to the arm part 11.

Also, the fixing protrusion 123 is provided at a lower side of the side surface 122 of the cover part 12. The fixing protrusion 123 may be provided to protrude inward from a bottom side of the side surface 122, and the lower side of the side surface of the fastening part, which overlaps the cover part 12, may be caught by the fixing protrusion 123.

Therefore, when the cover part 12 overlaps the fastening part inward from the outer side and is coupled to the arm part 11, when the fixing protrusion 123 of the cover part 12 moves along the side surface of the fastening part and then moves over the side surface of the fastening part, the cover part 12 is firmly fixed to the fastening part.

Conversely, when the fixing protrusion 123 moves sideward by an external force, because the fixing protrusion 123 deviates from the lower side of the side surface of the fastening part, outward movement of the cover part 12 relative to the fastening part is allowed. Therefore, the cover part 12 may be separated from the arm part 11. That is, the cover part 12 is detachably provided at the distal end of the arm part 11.

A coupling element 124 is provided at a lower side of a rear end of the side surface 122. The coupling element 124 is a portion that is bent or curved to protrude inward from the bottom side of the side surface 122. Like the fixing protrusion 123, the coupling element 124 may be in the form of a protrusion.

However, while the fixing protrusion 123 is a configuration for coupling the cover part 12 to the fastening part and has a degree of protrusion that allows the side surface of the fastening part to be caught, the coupling element 124 may have a degree of protrusion larger than that of the fixing protrusion 123 because the coupling element 124 has to sufficiently protrude inward from the cover part 12, which overlaps the fastening part, and be engaged with the adapter 30.

The coupling element 124 is a configuration caught by the adapter 3 which will be described below. The cover part 12, which constitutes the wiper arm 10, is fastened to the adapter 30 coupled to the wiper blade 20 and enables connection between the wiper arm 10 and the wiper blade 20.

The coupling element 124 is provided at the rear end of the side surface 122. Here, the side surface 122 of the cover part 12 may have a form gradually extending rearward from the lower side toward the rear end. That is, a back side of the side surface 122 of the cover part 12 is at least partially inclined.

The coupling element 124 may be provided as a pair of coupling elements 124 which are provided at both side surfaces 122 of the cover part 12, and the pair of coupling elements 124 may be provided at positions and heights that allow the pair of coupling elements 124 to face each other. Of course, the coupling elements 124 may also be provided at positions that cause the coupling elements 124 to be misaligned from each other.

A front surface 125 of the cover part 12 is provided to surround the distal end of the arm part 11. That is, as the cover part 12 is coupled to the distal end of the arm part 11, most of the fastening part may be covered by the cover part 12 at the arm part 11.

The front surface 125 provided at one side of the cover part 12 that is far from the proximal end of the arm part 11 may be smoothly connected to the outer surface 121 and form a curved surface. The front surface 125 may be in the form of an inclined surface. Here, when a locking part 32 of the adapter 30, which will be described below, includes a structure (a protruding part 3222 or the like) that faces the front surface 125 and the locking part 32 is placed in a locking state in which separation of the wiper arm 10 is not possible, the front surface 125 of the cover part 12 may be pressed by the locking part 32.

The front surface 125 of the cover part 12 and the distal end of the arm part 11 may be at least partially spaced apart, and a finishing part 13 may be provided at a portion at which the front surface 125 of the cover part 12 and the distal end of the arm part 11 are spaced apart. The finishing part 13 may be provided with a different material from the cover part 12 or the arm part 11. For example, the finishing part 13 may be formed of an elastic material.

The finishing part 13 may be provided at an inner side of the arm part 11 and partially protrude toward the front surface 125 of the cover part 12. The protruding portion may be placed between the front surface 125 of the cover part 12 and the distal end of the arm part 11.

That is, the fastening part may be provided in the form in which a front surface thereof is open. The finishing part 13 may be provided to pass through the open front surface of the fastening part while being inserted into the fastening part so as to be surrounded by the outer surface and the side surfaces of the fastening part.

Here, the portion of the finishing part 13 passing through the front surface of the fastening part has an inclined shape like the front surface 125 of the cover part 12. That is, when viewed from the side, the finishing part 13 is in the form of a trapezoidal block whose outer cross-section decreases relative to an inner cross-section. The extent to which the cross-section decreases corresponds to an angle of inclination of the front surface 125 of the cover part 12.

The finishing part 13 may have a height at which an inner surface protrudes inward from the fastening part or the cover part 12. That is, the finishing part 13 inserted into the distal end of the arm part 11 may form a portion that protrudes further inward past the cover part 12, which is coupled to the arm part 11, and an inner side end of the finishing part 13 may be seated on the adapter 30. To this end, the adapter 30 may include a structure in which the finishing part 13 is seated between a front surface 313 and a hinge part 318. The portion of the adapter 30 on which the finishing part 13 is seated may be formed of various structures, e.g., provided to support the finishing part 13 or provided with the finishing part 13 positioned therein and to allow the finishing part 13 to pass therethrough without supporting the finishing part 13.

The wiper blade 20 comes in close contact with a surface of a target of close contact and cleans the surface of the target of close contact by movement. The target of close contact may be a windshield of a vehicle, but is not limited thereto. The target of close contact may be any other object capable of being cleaned by sliding.

The wiper blade 20 has a close contact member 21 configured to directly come in close contact with the surface of the target of close contact and slide along the surface. The close contact member 21 has a cross-sectional structure that comes in close contact with the surface and makes friction with the surface appropriate to facilitate sliding for cleaning. For example, the close contact member 21 may have a form in which a V-shaped cross-section extends in a longitudinal direction.

That is, the close contact member 21 may be provided in a form in which a contact area with the target of close contact is reduced. For close contact with the surface, the close contact member 21 may be formed of a material such as rubber that has a shock-absorbing force.

In a state in which an external force is not applied to the close contact member 21, a close-contact side of the close contact member 21 may have a different shape from the surface of the target of close contact. However, when the wiper blade 20 is coupled to the wiper arm 10, as the close contact member 21 is pressed toward the target of close contact, the close-contact side may naturally be deformed to a shape that corresponds to the surface of the target of close contact.

The wiper blade 20 may include an elastic member (not illustrated) for applying an elastic force to the close contact member 21. The elastic member may be a member such as a leaf spring.

Due to the elastic member, the close-contact side of the close contact member 21 receives a force that attempts to return the close-contact side to a curved form that is more bent than the surface of the target of close contact. Therefore, the close-contact side, which is pressed by the wiper arm 10 and deformed, applies a force attempting to push the target of close contact but maintains a state of being pressed by the wiper arm 10, thereby being firmly in close contact with the target of close contact.

The elastic member is formed of a material (metal or the like) that is more rigid than the close contact member 21 or a cover member 22, which will be described below. The elastic member may be a configuration for maintaining a long shape of the wiper blade 20.

The cover member 22 may be provided at an outer side of the close contact member 21 (or the elastic member), The cover member 22 may be a configuration for maintaining the form of the wiper blade 20 by being coupled to the close contact member 21, which is easily deformed, via the elastic member.

For example, a long groove may be provided in a center of the elastic member in the longitudinal direction, and the close contact member 21 may have a structure that is fitted to the groove of the elastic member. Also, a groove to which both ends of the elastic member are fitted may be provided inside the cover member 22 in the longitudinal direction, and the elastic member may be fixed to the cover member.

That is, the cover member 22 and the close contact member 21 may be coupled about the elastic member. Of course, various fixing structures may be applied, other than a method of fixing using a groove as described above. The cover member 22 and the close contact member 21 may also be coupled to each other while the elastic member is disposed therebetween.

In order to prevent the wiper blade 20 from floating over the target of close contact due to wind, the cover member 22 may be in a form in which an A-shaped or Λ-shaped cross-section extends in the longitudinal direction. That is, the cross-section of the cover member 22 may be formed to be relatively symmetrical to the close contact member 21.

The cover member 22 may be provided with a material or structure that is more rigid than the close contact member 21, and the elastic member may be accommodated between the cover member 22 and the close contact member 21. Because the elastic member, which is formed of a metal or the like, is surrounded by the cover member 22 and the close contact member 21, contact between moisture and the elastic member may be prevented, and generation of rust in the elastic member may be suppressed.

In order to finish both ends of the cover member 22 and the close contact member 21, a finishing cap (not denoted by a reference numeral) may be provided at both ends of the cover member 22 and the close contact member 21. However, the finishing cap may also be modified in various ways or omitted.

A coupling cover 23 for coupling with the wiper arm 10 is provided at a central portion of the cover member 22. The coupling cover 23 is a configuration that connects the wiper blade 20 to the adapter 30 so that the wiper blade 20 hinge-rotates about the adapter 30.

For example, in a coupling process, the coupling cover 23 and the adapter 30 may form a hinge shaft and a structure that rotates about the hinge shaft. Here, the coupling cover 23 may include a coupling hole 231 in order to form a rotating structure.

A catching protrusion 232 may be provided at an outer side of the coupling hole 231 and hold the hinge shaft, which is inserted into the coupling hole 231, so that the hinge shaft is not separated from the coupling hole 231. Of course, in a case in which the coupling hole 231 itself has an arc shape, which is a shape in the middle of a circular shape and a semi-circular shape, the hinge shaft forcibly fitted to the coupling hole 231 may not fall out of the coupling hole 231. Therefore, the catching protrusion 232 may be omitted according to the shape of the coupling hole 231.

The coupling cover 23 and the cover member 22 may be directly connected but may also be indirectly connected using a base member 24. The base member 24 may be fixed to the elastic member and engaged with the cover member 22 using various, non-limited methods (catching by a protrusion, forcible fitting, adhesion, etc.). When coupled to each other, the base member 24 and the elastic member may maintain a binding force that does not allow rotation or movement relative to each other.

The base member 24 may be provided at the cover member 22 or the like that is relatively deformable and may be provided with a material that allows stable coupling between the wiper blade 20 and the adapter 30. The base member 24, the cover member 22, and the like may be formed of synthetic resin, metal, or the like.

The base member 24 may be provided at a substantially central portion of the wiper blade 20 in the longitudinal direction and form a plane on which the coupling cover 23 is seated. In this case, the cover member 22, which has a cross-section that protrudes outward, may form a flat cross-section at a portion where the base member 24 is provided.

The base member 24 may surround left and right sides of the cover member 22 and the close contact member 21 and maintain a state in which the cover member 22 and the close contact member 21 are coupled to each other. Here, central portions of the cover member 22 and the close contact member 21 may be coupled by the base member 24, and both ends of the cover member 22 and the close contact member 21 may be coupled by a finishing cap.

The adapter 30 is used to couple the wiper blade 20 to the wiper arm 10. The adapter 30 may be firmly fixed to the arm part 11 via the cover part 12 of the wiper arm 10, and movement of the adapter 30 and the arm part 11 relative to each other may not be allowed. On the other hand, the adapter 30 may be connected so that rotation of the adapter 30 and the wiper blade 20 relative to each other is allowed. The adapter 30 includes a main body part 31 and a locking part 32.

The main body part 31 of the adapter 30 is coupled to the wiper blade 20, Particularly, the main body part 31 may be coupled to the coupling cover 23 of the wiper blade 20.

The main body part 31 may include an outer surface 312 which faces the outer surface 121 of the cover part 12 of the wiper arm 10, side surfaces 311 which face the side surfaces 122 of the cover part 12, the front surface 313 which faces the locking part 32, and a rear surface 314, which is opposite the front surface 313. For reference, in this specification, "surface" does not necessarily refer to a flat surface and should be interpreted as a portion deformed in various ways, such as a depression, a protrusion, a step, a concave-convex portion, and a curved surface.

A guide part 315 is provided at the side surface 311 of the main body part 31 that faces the side surface 122 of the cover part 12. The guide part 315 is engaged with the coupling element 124, which is disposed at the lower side of the side surface 122 of the cover part 12, and allows the wiper arm 10 to be coupled to the adapter 30.

The guide part 315 has an insertion part 3151, which is relatively recessed on the side surface 311 and extends substantially vertically, and a catching part 3152, which extends substantially horizontally from a distal end of the insertion part 3151 (for example, an inner side end thereof facing the target of close contact). The insertion part 3151 may guide the coupling element 124 to be inserted inward from the outer side and may be provided in the form of a groove. That is, due to the presence of the guide part 315, the side surface 311 of the main body part 31 may form a concave-convex structure.

The coupling element 124 that moved to the innermost side of the insertion part 3151 may move to the catching part 3152. The catching part 3152 may be in the form of a groove that extends from the inner side end of the insertion part 3151 in a direction different from a direction in which the insertion part 3151 extends. For example, unlike the insertion part 3151 that extends vertically, the catching part 3152 may extend in a horizontal direction.

The insertion part 3151 and the catching part 3152 may be connected to form an L-shape. In this case, the coupling element 124 of the cover part 12 moves inward along the insertion part 3151 while being seated on the insertion part 3151, thereby facilitating close contact between the wiper arm 10 and the adapter 30. Then, the coupling element 124 is seated on the catching part 3152 extending from the insertion part 3151.

Here, the catching part 3152 may allow movement of the coupling element 124 only in a second direction that is different from a first direction in which the coupling element 124 is inserted into the insertion part 3151. In this way, the catching part 3152 may block movement of the coupling element 124 in the first direction. Here, the first direction refers to an inner side-outer side direction, which is a direction in which the wiper arm 10 is separated from the adapter 30.

Therefore, the insertion part 3151 allows the coupling element 124 of the cover part 12 to move inward from the outer side such that the wiper arm 10 comes in close contact with the adapter 30, and the catching part 3152 suppresses the coupling element 124 from moving outward from the inner side such that the adapter 30 is fixed to the wiper arm 10.

Of course, unlike in the drawings, the insertion part 3151 may be, instead of being vertical, provided in the form of a tilt line that is tilted at a predetermined angle with respect to the inner side-outer side direction. In this case, when the wiper arm 10 is being fitted to the adapter 30, the wiper arm 10 may move in up-down and front-rear directions.

The catching part 3152 may also be provided to be tilted instead of being provided in the horizontal direction that is parallel to the front-rear direction, thereby allowing the insertion part 3151 and the catching part 3152 to move in an L-shape, a V-shape, or the like that is tilted. Here, an angle between the insertion part 3151 and the catching part 3152 may be less than a right angle such that separation of the coupling element 124 is suppressed.

Alternatively, in order to facilitate insertion of the coupling element 124, the insertion part 3151 may be in a form in which a width of an inlet portion (an outer side end), through which the coupling element 124 is inserted, is larger than a width of an inner side end connected to the catching part 3152. That is, the insertion part 3151 may be in the form of a V-shaped groove in the side surface 311 of the main body part 31.

In the cover part 12 of the wiper arm 10, the coupling element 124 may be provided at the lower side of the rear end of the side surface 122. Thus, in the main body part 31 of the adapter 30 that is engaged with the wiper arm 10, the guide part 315 may be provided at a position corresponding to the coupling element 124. For example, the guide part 315 may be provided at the rear end of the side surface 311 in the main body part 31.

The main body part 31 may be surrounded by the cover part 12 of the wiper arm 10 when the wiper arm 10 is coupled to the adapter 30. The distal end of the arm part 11 may overlap the inner side of the cover part 12. Also, because the cover part 12 and the distal end of the arm part 11 (the fastening part) are provided in the form having the outer surface 121 and the pair of side surfaces 122, when the wiper arm 10 is coupled to the adapter 30, the main body part 31 is surrounded by the cover part 12 of the wiper arm 10 and the fastening part.

Therefore, because the fastening part is placed between the side surface 311 of the main body part 31 and the cover part 12, for the coupling element 124, which protrudes inward from the side surface 122 of the cover part 12, to be coupled to the guide part 315 of the main body part 31, the coupling element 124 may have a length protruding further inward past a thickness of the fastening part facing the side surface 311 of the main body part 31. This is the same as in the description above.

The inner side end of the insertion part 3151 may be provided in a closed form. The coupling element 124 may move along the insertion part 3151, be blocked by the inner side end, and then move to be inserted into the catching part 3152. That is, the wiper arm 10 is fastened to the adapter 30 by moving along the shape of the guide part 315.

Alternatively, the inner side end of the insertion part 3151 may also be provided in an open form as shown in FIG. 5 or the like. However, because the outer surface 312 of the main body part 31 comes in contact with the arm part 11 and limits inward movement of the wiper arm 10, or a step part 316, which will be described below, comes in contact with the lower end of the cover part 12 and limits the inward movement of the wiper arm 10, the coupling element 124 does not pass through the open inner side end of the insertion part 3151. That is, at a position at which the inward movement of the wiper arm 10 is limited by various structures, the coupling element 124 inserted into the insertion part 3151 may move to the catching part 3152.

In the main body part 31, the hinge part 318 is provided at one side (front side) of the guide part 315. The hinge part 318 may connect the locking part 32 to the main body part 31 and form a central axis about which the locking part 32 hinge rotates with respect to the main body part 31.

The hinge part 318 extends forward from the front surface 313 of the main body part 31. In order to implement stable rotation of the locking part 32, the hinge part 318 may be provided as a pair of hinge parts 318 disposed at both sides of the front surface 313 of the main body part 31. Here, each hinge part 318 may be provided in the form of a free end that is deformable so that front ends of the hinge parts 318 are able to come close to each other by an external force. This is to rotate the locking part 32 so that the locking part 32 placed in the locking state reaches an unlocking state.

However, in order to maintain a gap between the pair of hinge parts 318, an elastic bar 3182 configured to connect the hinge parts 318 may be provided as illustrated in FIG. 10. Keeping the pair of hinge parts 318 spaced apart from each other indicates that the locking state of the locking part 32 is maintained. This will be described in detail below.

A rotation limiting element 3181 protrudes from one side of the hinge part 318. The rotation limiting element 3181 may be provided in the form of a protrusion. When the locking part 32 rotates about the hinge part 318, moves over the rotation limiting element 3181, and reaches the locking state, the rotation limiting element 3181 may limit rotation of the locking part 32 in the opposite direction and maintain the state in which the wiper arm 10 is fixed to the adapter 30.

In order to reduce weight and reduce a load of the driving source for moving the wiper blade 20 while maintaining structural rigidity, the main body part 31 may be formed of a structure (a groove or the like) in which a thickness of the side surface 311 partially decreases. Such a structure may be provided regardless of coupling with the wiper or the wiper blade 20.

Alternatively, a hole 3121 may be formed in the outer surface 312 of the main body part 31. However, the structure is not limited to those illustrated in the drawings of this specification, and various other structures for reducing the weight of the adapter 30 may be applied in various ways.

The step part 316 that faces the lower end of the side surface 122 of the cover part 12 of the wiper arm 10 may protrude from each of both side surfaces of the main body part 31. The step part 316 is provided so that the lower end of the cover part 12 is seated thereon. The cover part 12 and the step part 316 may be disposed to come in contact with or come very close to each other when the wiper arm 10 is coupled to the adapter 30.

That is, due to including the step part 316, the main body part 31 may have a stair-like shape whose cross-section is vertically symmetrical. The main body part 31 having such a shape is engaged with the C-shaped cover part 12 and forms a continuous shape therewith.

At least a portion of the step part 316 may protrude to a degree at which a horizontal width of the step part 316 corresponds to the horizontal width of the cover part 12. That is, when the wiper arm 10 is connected to the adapter 30, a side end of the step part 316 may be placed to be continuous from the side surface 2 of the cover part 12.

However, at least another portion of the step part 316 may be provided in a size that exceeds the horizontal width of the cover part 12, and a sidewall part 317 may be provided at the corresponding portion. The sidewall part 317 will be described in detail below.

The hinge part 318 may be provided to extend forward from the step part 316 of the main body part 31. The hinge part 318 and the step part 316 may form a continuous, connected shape instead of being structurally differentiated.

The step parts 316 provided at the left and right sides of the main body part 31 may be connected to each other between the pair of hinge parts 318 and the front surface 313 of the main body part 31. A portion at which the pair of step parts 316 are connected to each other may be used as the above-described portion on which the finishing part 13 is seated. That is, as the finishing part 13 of the wiper arm 10 is seated by the portion at which the step parts 316 at the left and right sides are connected to each other, the inward movement of the wiper arm 10 may be blocked.

The step part 316 may be provided in the shape that is continuous in the front-rear direction of the main body part 31. In this case, the step part 316 may also be formed at a position at which the guide part 315 of the main body part 31 is provided. However, an opening 3161 that comes in communication with the insertion part 3151 may be provided at a position on the step part 316 that corresponds to the catching part 3152.

Here, as it can be seen from FIGS. 4 and 5, the opening 3161 may come in communication with a portion of the insertion part 3151 or provided to come in communication with the catching part 3152. That is, in order to block the inward movement of the coupling element 124, the opening 3161 may be formed so that at least a portion of the inner side end of the insertion part 3151 is closed.

Because the coupling element 124 is inserted along the insertion part 3151 of the guide part 315 and then moves to the catching part 3152, the coupling element 124 may not pass through the opening 3161. However, the opening 3161 may also be utilized in seating of the coupling element 124 according to the shape of the coupling element 124, an angle of protrusion of the catching part 3152, and the like.

The step part 316 may have the maximum height at a substantially central portion of the main body part 31, and the height of the step part 316 may decrease substantially proportionally in the front-rear direction. This is to, in a case in which a seating element 3191, which will be described below, is provided between the pair of step parts 316, allow the adapter 30 to rotate about the seating element 3191 as a hinge shaft by a predetermined angle with respect to the wiper blade 20. This will be described below.

The sidewall part 317 is provided at the step part 316. The sidewall part 317 may cover the side surface 122 of the cover part 12 of the wiper arm 10. The sidewall part 317 may protrude outward from a surrounding portion of the step part 316 and surround the side surface 122 of the cover part 12, thereby restricting horizontal movement of the wiper arm 10.

The sidewall part 317 may be provided as a plurality of sidewall parts 317 at a single step part 316. For example, the sidewall part 317 may have a first sidewall part 317a, which protrudes from the surrounding portion of the step part 316 adjacent to the hinge part 318 and comes in contact with the locking part 32, and a second sidewall part 317b, which protrudes from the surrounding portion of the step part 316 outer side of the insertion part 3151 and covers a portion of a sidewall of the cover part 12 at which the coupling element 124 is provided.

The first sidewall part 317a has a front end provided in the shape of an inclined surface. Here, a rotary surface 321 of the locking part 32, which will be described below, may be engaged with the inclined front end of the first sidewall part 317a. Also, when the locking part 32 is placed in the locking state, a rear end of the first sidewall part 317a may form a shape that is continuous from a rear end of the rotary surface 321.

The second sidewall part 317b is provided to surround the coupling element 124, which is seated on the catching part 3152, from both sides. Assuming a case in which the side surface 122 of the cover part 12 is bent in a direction in which the lower end at which the coupling element 124 is provided is displaced sideward, in this case, there is a concern that the cover part 12 may be separated from the adapter 30 due to the coupling element 124 being separated from the guide part 315 while moving over the catching part 3152.

Therefore, the second sidewall part 317b surrounds the side surface 122 of the cover part 12 to suppress deformation of the side surface 122, maintains the state in which the coupling element 124 is seated on the catching part 3152, and prevents occurrence of a situation in which the coupling element 124 moves over the catching part 3152. Here, unlike the first sidewall part 317a comes in contact with the rotary surface 321 of the locking part 32 while surrounding the side surface 122 of the cover part 12, the second sidewall part 317b may only be provided for a function of preventing separation of the coupling element 124 by surrounding the side surface 122 of the cover part 12 and may have a height lower than the first sidewall part 317a.

The horizontal width of the step part 316 may correspond to the cover part 12 at the substantially central portion of the main body part 31 and may gradually increase toward a portion at which the first sidewall part 317a is provided or a portion at which the second sidewall part 317b is provided. Also, the horizontal width of the step part 316 may be maximum at a portion of the step part 316 at which the first sidewall part 317a or the second sidewall part 317b is provided.

As illustrated in FIGS. 4 and 5, the first sidewall part 317a and the second sidewall part 317b may be provided to be spaced apart by a predetermined distance in the front-rear direction. In this case, the horizontal width of the step part 316 may be minimum at a substantially central portion and may increase in the front-rear direction.

On the other hand, the first sidewall part 317a may also be provided to be continuous from the second sidewall part 317b. In this case, most of the portions of the step part 316 may have a horizontal width that is larger than that of the cover part 12.

Alternatively, as illustrated in FIGS. 11A to 11C, the second sidewall part 317b may be provided in front of a position at which the guide part 315 is provided, extend in the front-rear direction, and integrally provided with the first sidewall part 317a. In this case, because the side surface 122 of the cover part 12 is sufficiently surrounded by the second sidewall part 317b that is provided to be long in the front-rear direction as compared to FIG. 4, separation of the wiper arm 10 may be suppressed without a sidewall part 317 that directly surrounds the portion at which the coupling element 124 is disposed.

A seating part 319 may be provided at an inner side of the main body part 31. The seating part 319 is coupled to the wiper blade 20. The seating part 319 may be coupled to the coupling cover 23 of the wiper blade 20 and allow hinge-rotation between the wiper blade 20 and the main body part 31.

For example, referring to FIGS. 3 to 8, the coupling hole 231 may be provided in the coupling cover 23, and the seating element 3191, which is in the form of a bar that is insertable into the coupling hole 231, may be provided at the seating part 319.

Here, the coupling hole 231 may be in a cylindrical shape whose one side is open, and a catching protrusion 232 for preventing separation of the seating element 3191 may be provided. Because the seating element 3191 has a width that is larger than a width of one side of the coupling hole 231 that is open, the seating element 3191 may be fastened to the coupling hole 231 by being forcibly fitted thereto. The seating element 3191 fastened to the coupling hole 231 may serve as a hinge shaft so that the wiper arm 10 and the wiper blade 20 rotate relative to each other.

Therefore, both ends of the wiper blade 20 may be provided to be rotatable about the seating element 3191, and, in this way, the wiper blade 20 may effectively come in close contact with targets of close contact of various shapes.

For hinge-rotation of the adapter 30, as described above, a portion of the main body part 31 at which the step part 316 is formed may have a side surface whose height gradually decreases in the front-rear direction about the hinge shaft. That is, the lower end of the step part 316 may be in the shape of a V-shaped curve or a U-shaped curve whose lowest point is the portion at which the seating element 3191 is provided. Here, a difference between a height of each of the front and rear ends of the step part 316 and the maximum height of the step part 316 at a substantially central portion thereof may determine an angle at which the adapter 30 rotates about the seating element 3191 as the hinge shaft.

The locking part 32 is rotatably provided in the main body part 31. The locking part 32 may be provided in a cap-like shape. Specifically, the locking part 32 has a pair of rotary surfaces 321 rotatably coupled to the hinge parts 318 and a cover surface 322 which extends between the rotary surfaces 321 and covers the outer surface 121 of the cover part 12 of the wiper arm 10 that surrounds the main body part 31.

The rotary surface 321 of the locking part 32 may be bound to be rotatable about the hinge part 318. For example, a protruding portion of the hinge part 318 may be inserted into the rotary surface 321 and serve as a center of rotation of the rotary surface 321.

The rotary surface 321 may be coupled to the hinge part 318 such that the hinge part 318 is exposed to the outside. This is because the pair of hinge parts 318 should be deformed to come close to each other (by overcoming the elastic force of the elastic bar 3182) in order to allow unlocking of the locking part 32. That is, the rotary surface 321 of the locking part 32 forms an exposed portion through which an external force may be applied to the hinge part 318.

A gap between the pair of rotary surfaces 321 may be larger than the horizontal width of the cover part 12. Therefore, when the locking part 32 is placed in the locking state, the rotary surfaces 321 may be placed to surround both sides of the cover part 12.

A protruding element 3211 is provided at a surface of the rotary surface 321, The protruding element 3211 is a configuration that allows the user to grip the locking part 32 and easily rotate the locking part 32. Of course, instead of a single protruding structure, a structure that gives friction so that the user is able to grip the locking part 32 is also possible.

Rotation of the locking part 32 is limited rotation limiting element 3181 of the hinge part 318. When an external force acts so that the hinge parts 318 come close to each other, the rotation of the locking part 32 may be allowed. Therefore, the user may grip the locking part 32 using the protruding element 3211 and rotate the locking part 32 while pressing the portion of the hinge part 318, to which the rotary surface 321 is coupled, that is exposed to the outside.

The rotary surface 321 may be formed in a shape corresponding to the first sidewall part 317a so that a portion of the rotary surface 321 that faces the first sidewall part 317a provided at the adapter 30 is engaged with the first sidewall part 317a. Because, as described above, the portion of the first sidewall part 317a that faces (or comes in contact with) the rotary surface 321 is in the form of an inclined surface, the portion of the rotary surface 321 that is formed in a shape corresponding to the first sidewall part 317a may be referred to as chamfer 3212.

Here, the chamfer 3212 may have a shape that is bent or curved at least one time instead of having a simple diagonal shape. The shape of the chamfer 3212 may be determined in various ways according to the shape of the first sidewall part 317a.

The cover surface 322 connected to the rotary surface 321 covers the outer surface 121 of the cover part 12 of the wiper arm 10 and prevents the wiper arm 10 from being separated outward. To this end, a cover element 3221 that extends toward the guide part 315 may be provided at a rear end side of the cover surface 322.

When the locking part 32 is placed in the locking state, the cover element 3221 may be placed at a position at which it is projected on the outer surface 121 of the wiper arm 10 coupled to the adapter 30 and may interfere with outward movement of the wiper arm 10.

The cover element 3221 may extend to be placed on the outer side of the first sidewall part 317a in the locking state. This is in consideration of the fact that, for the cover part 12 of the wiper arm 10 to be covered by the first sidewall part 317a, the outer surface 121 of the cover part 12 is provided at least at the outer side of the first sidewall part 317a.

Here, the rotary surface 321 may have a rear end side that is aligned to the cover element 3221 extending from the rear end side of the cover surface 322. Therefore, because the rotary surface 321 faces the inclined surface of the first sidewall part 317a and the cover element 3221 is placed at the outer side of the first sidewall part 317a, both side surfaces 122 at the front end of the cover part 12 may be covered by the first sidewall part 317a and the rotary surface 321, and the outer surface 121 at the front end of the cover part 12 may be covered by the cover element 3221.

The cover surface 322 may cooperate with the rotation limiting element 3181 and allow or limit the rotation of the locking part 32. Specifically, when the locking part 32 rotates clockwise about the hinge part 318 in FIGS. 8 and 9, a lower end of the cover surface 322 moves over the rotation limiting element 3181.

Here, as the rotation limiting element 3181 is placed below the cover surface 322, counterclockwise rotation of the locking part 32 is blocked by the rotation limiting element 3181. Therefore, this state is the locking state of the locking part 32.

On the other hand, when the pair of hinge parts 318 are deformed in a direction coming close to each other, positions of the rotation limiting elements 3181 may be slightly changed rearward in a direction deviating from the cover surface 322 while the rotation limiting elements 3181 come close to each other. Thus, the lower end of the cover surface 322 may become misaligned with the rotation limiting elements 3181.

Therefore, here, the locking part 32 may rotate counterclockwise, and the lower end of the cover surface 322 is disposed below the rotation limiting element 3181. In this state, the locking part 32 is in the unlocking state in which the outer surface 121 of the cover part 12 is exposed.

Referring to FIG. 9, the protruding part 3222 may be provided at an inner surface of the cover surface 322 that faces the inclined front surface 125 of the wiper arm 10. The front surface 125 of the cover part 12 coupled to the arm part 11 of the wiper arm 10 is formed to be inclined while surrounding the arm part 11. As mentioned above, the locking part 32 may utilize the inclined front surface 125 of the wiper arm 10 and prevent separation of the wiper arm 10.

That is, the protruding part 3222 may be formed at the inner side of the cover surface 322 corresponding to the inclined front surface 125 of the wiper arm 10, and a portion of the protruding part 3222 that faces the front surface 125 of the cover part 12 may be cut to be inclined.

Therefore, the protruding part 3222 and the cover part 12 may come in contact or be adjacent such that parallel surfaces thereof face each other. Here, when the locking part 32 is placed in the locking state, the protruding part 3222 may press the front surface 125 inward or restrict outward movement of the front surface 125, thereby suppressing separation of the wiper arm 10.

Hereinafter, a coupling method according to the present invention will be described in detail by referring back to FIGS. 11A to 11C.

Referring to FIGS. 11A to 11C, (A) as the pair of hinge parts 318 are pressed by an external force in a direction coming close to each other, the locking part 32 rotates counterclockwise by a hand or the like of a user gripping the locking part 32 using the protruding element 3211 of the rotary surface 321, and the locking part 32 reaches the unlocking state in which the main body part 31 is not covered by the locking part 32. In this way, separation of the wiper arm 10, which has been fastened, may be possible.

Here, as a front end side of the cover surface 322 comes in contact with the inner side end of the hinge part 318, the locking part 32 may be rotatable up to an angle at which the entire inner side surface of the cover surface 322 is exposed to the outside.

(B) When the locking part 32 is placed in the unlocking state due to rotation of the locking part 32, the cover part 12 of the wiper arm 10 may be seated on the main body part 31. Here, as the coupling element 124 of the cover part 12 slides along the insertion part 3151 provided in the guide part 315 of the main body part 31, the wiper arm 10 moves inward so as to come in close contact with the main body part 31.

Then, when the wiper arm 10 is slid in the horizontal direction with reference to FIGS. 11A to 11C, the coupling element 124 of the wiper arm 10 deviates from the insertion part 3151 and is inserted into the catching part 3152 extending from the insertion part 3151. Therefore, because outward movement of the coupling element 124 is blocked by the catching part 3152, the wiper arm 10 may be fastened to the main body part 31.

In FIG. 11B, movement of the wiper arm 10 may be determined according to the shape (for example, L-shape) of the guide part 315 having the insertion part 3151 and the catching part 3152. In a case in which the shape of the guide part 315 changes as described above, the movement of the wiper arm 10 fastened to the adapter 30 may also change.

(C) Then, when the locking part 32 is rotated clockwise, the rotary surface 321 is engaged with the shape of the first sidewall part 317a, and the cover element 3221 of the cover surface 322 covers at least a portion of the outer surface 121 of the cover part 12 of the wiper arm 10 that is coupled to the main body part 31. Also, the protruding part 3222 protruding from the inner side of the cover surface 322 is adjacent to or comes in contact with the front surface 125 of the cover part 12 of the wiper arm 10.

Here, as the front end side of the cover surface 322 is seated on the rotation limiting element 3181 after the cover surface 322 moves over the rotation limiting element 3181, counterclockwise rotation of the locking part 32 may be limited.

By such operations, the wiper arm 10 may be suppressed from being separated outward by a combination of various factors, e.g., the fastening element being seated on the catching part 3152, the protruding part 3222, which is provided at the cover surface 322 of the locking part 32, being inclined to face the front surface 125 of the wiper arm 10, and the cover element 3221 of the locking part 32 covering the outer surface 121 of the cover part 12.

As described above, the embodiments relate to an idea of assembling the wiper apparatus 1 by connecting the wiper arm 10 and the wiper blade 20. In order to fix the wiper arm 10 in which the cover part 12 is coupled to the arm part 11 and the coupling element 124 is disposed at the rear end of the side surface 122 of the cover part 12, the guide part 315 corresponding to the wiper arm 10 may be provided, and the adapter 30 including the locking part 32 may be used. In this way, it is possible to implement firm fastening of the wiper arm 10 to the wiper blade 20.

A wiper blade assembling adapter, a wiper blade assembly, and a wiper apparatus according to the present invention utilize a locking part that, by rotating, opens an upper side of a body part when a wiper needs to be separated and covers the upper side of the body part and prevents separation of the wiper when the wiper needs to be fixed, thereby facilitating replacement of the wiper and allowing firm fastening between a wiper blade and a wiper arm.

The present invention has been described above in detail using specific embodiments thereof. However, the embodiments are merely for describing the present invention in detail, and the present invention is not limited to the embodiments. It should be apparent that the present invention may be changed or modified by those of ordinary skill in the art within the technical idea of the present invention.

Any simple modification or change of the present invention falls within the scope of the present invention. The specific scope of the present invention should become apparent by the attached claims.

What is claimed is:

1. A wiper blade assembling adapter for coupling a wiper blade to a wiper arm, which has an arm part configured to rotate about a proximal end and a cover part coupled to a distal end of the arm part, wherein a coupling element protrudes inward from a lower side of a rear end at a side surface of the cover part, the wiper blade assembling adapter comprising:
   a main body part coupled to the wiper blade; and
   a locking part rotatably provided in the main body part,
      wherein the main body part includes a guide part, which has an insertion part into which the coupling element of the wiper arm is inserted in a first direction and a catching part which extends from the insertion part and is configured to block movement of the coupling element in the first direction after the coupling element moves in a second direction, and a hinge part disposed at one side of the guide part,
      wherein the locking part has a rotary surface which is rotatably coupled to the hinge part and a cover surface which extends from the rotary surface and covers an outer surface of the wiper arm that surrounds the main body part,
   wherein a step part, on which a lower end of the cover part is seated, protrudes from a side surface of the main body part, and
   wherein the main body part further includes a sidewall part that protrudes from a surrounding portion of the step part and surrounds a side surface of the cover part.

2. The wiper blade assembling adapter of claim 1, wherein an opening that comes in communication with the insertion part is provided at a position on the step part that corresponds to the catching part.

3. The wiper blade assembling adapter of claim 1, wherein the sidewall part has a first sidewall part, which protrudes from the surrounding portion of the step part adjacent to the hinge part and comes in contact with the locking part, and a second sidewall part, which protrudes from the surrounding portion of the step part outer side of the insertion part and covers the coupling element.

4. The wiper blade assembling adapter of claim 1, wherein a chamfer having a shape corresponding to the sidewall part is provided at a portion of the rotary surface that faces the sidewall part.

5. The wiper blade assembling adapter of claim 1, wherein a rotation limiting element protrudes from one side of the hinge part, and the locking part changes between an unlocking state, in which a lower end of the cover surface is disposed below the rotation limiting element and causes an outer surface of the main body part to be exposed, and a locking state, in which the rotary surface rotates and the lower end of the cover surface moves over the rotation limiting element and covers the outer surface of the main body part.

6. The wiper blade assembling adapter of claim 5, wherein the cover surface has a cover element that extends from a distal end toward the guide part, and the cover element covers the cover part seated on the main body part in the locking state.

7. The wiper blade assembling adapter of claim 1, wherein the hinge part is provided as a pair of hinge parts at both sides of one surface of the main body part, each hinge part is provided in the form of a free end that is deformable so that distal ends of the hinge parts are able to come close to each other, and an elastic bar configured to connect the pair of hinge parts to each other is provided to maintain a gap between the hinge parts.

8. A wiper blade assembly comprising:
a wiper blade which has a close contact member configured to come in close contact with a surface of a target of close contact; and
an adapter which is fastened to the wiper blade and to and from which a wiper arm, which has a form in which a cover part is coupled to a distal end of an arm part, is attached and detached,
wherein the adapter includes a main body part coupled to the wiper blade and a locking part rotatably provided in the main body part,
wherein the main body part includes an insertion part into which a coupling element, which protrudes from a side surface of the cover part that surrounds a side surface of the main body part, is inserted and a catching part configured to catch the coupling element seated thereon after passing through the insertion part,
wherein the locking part has a rotary surface which is rotatably connected to the main body part and a cover surface which covers an outer surface of the wiper arm that covers an outer surface of the main body part,
wherein a step part, on which a lower end of the cover part is seated, protrudes from a side surface of the main body part, and
wherein the main body part further includes a sidewall part that protrudes from a surrounding portion of the step part and surrounds a side surface of the cover part.

9. The wiper blade assembly of claim 8, wherein the wiper blade further includes an elastic member configured to provide an elastic force to the close contact member in a direction in which close contact with the close contact member occurs, and a cover member configured to cover the elastic member.

10. The wiper blade assembly of claim 8, wherein the wiper blade further includes a coupling cover provided at a center and to which the adapter is coupled,
wherein a coupling hole in a cylindrical shape whose one side is open is provided in any one of the main body part and the coupling cover, and a bar-shaped seating element configured to be forcibly fitted to the coupling hole is provided at the other one of the main body part and the coupling cover.

11. The wiper blade assembly of claim 10, wherein the seating element is fastened to the coupling hole and serves as a hinge shaft so that the wiper arm and the wiper blade rotate relative to each other.

* * * * *